United States Patent
Cardu et al.

(10) Patent No.: US 9,647,565 B2
(45) Date of Patent: May 9, 2017

(54) METHOD FOR DRIVING A RESONANT CONVERTER, AND CORRESPONDING CONVERTER AND COMPUTER PROGRAM PRODUCT

(71) Applicant: STMicroelectronics S.R.L., Agrate Brianza (IT)

(72) Inventors: Roberto Cardu, Bologna (IT); Massimiliano Picca, Muggiò (IT); Lorenzo Trevisan, Tavazzano con Villavesco (IT); Cristian Porta, Canegrate (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/141,314

(22) Filed: Apr. 28, 2016

(65) Prior Publication Data

US 2017/0099001 A1   Apr. 6, 2017

(30) Foreign Application Priority Data

Oct. 1, 2015   (IT) .............................. UB15A004179

(51) Int. Cl.
*H02M 3/335*   (2006.01)
*H02M 1/08*   (2006.01)

(52) U.S. Cl.
CPC ......... *H02M 3/33507* (2013.01); *H02M 1/08* (2013.01)

(58) Field of Classification Search
CPC .. H02M 3/335; H02M 3/33507; H02M 3/337; H02M 3/158; H02M 2001/0048; H02M 2001/00058; H02M 2003/1586

(Continued)

(56) References Cited

U.S. PATENT DOCUMENTS

2004/0136209 A1   7/2004   Hosokawa et al.
2010/0232180 A1*  9/2010   Sase .................. H02M 3/33576
                                                          363/17

(Continued)

FOREIGN PATENT DOCUMENTS

EP         1 909 381 A1      4/2008

OTHER PUBLICATIONS

Balogh, "Design Review: 100W, 400kHz, DC/DC Converter With Current Doubler Synchronous Rectification Achieves 92% Efficiency," Texas Instruments Incorporated, 2001, 26 pages.

(Continued)

*Primary Examiner* — Gary L Laxton
*Assistant Examiner* — Kyle J Moody
(74) *Attorney, Agent, or Firm* — Seed IP Law Group LLP

(57) ABSTRACT

A driving module of a resonant converter receives an enabling signal and a voltage across a switch of a secondary side, and generates a control signal for first and second switches of the secondary side. The driving module cyclically controls switches of a primary full-bridge switching stage and both switches of the secondary side. After a fixed time, the driving module turns off the low-side switch and turns on the high-side switch, waits for a rising edge of the enabling signal, waits for zero current in the secondary side switches, turns off the first switch via the control signal after a variable delay relative to the rising edge of the enabling signal, keeps the second switch on, waits for zero voltage across the first switch, switches back on the first switch via the control signal when the voltage measured across the first switch drops below a variable threshold.

20 Claims, 12 Drawing Sheets

(58) Field of Classification Search
USPC .................................. 363/17, 21.02, 21.03
See application file for complete search history.

(56) References Cited

U.S. PATENT DOCUMENTS

| | | | |
|---|---|---|---|
| 2011/0194206 A1* | 8/2011 | Sase .................. | H02M 3/33592 360/75 |
| 2012/0147629 A1* | 6/2012 | Mao ........................ | H02M 3/28 363/17 |
| 2013/0265804 A1* | 10/2013 | Fu ..................... | H02M 3/33576 363/17 |
| 2014/0009968 A1* | 1/2014 | Matsuura .......... | H02M 3/33507 363/17 |
| 2015/0043249 A1 | 2/2015 | Iorio et al. | |
| 2015/0049522 A1 | 2/2015 | Iorio et al. | |
| 2015/0049529 A1 | 2/2015 | Iorio et al. | |
| 2015/0222193 A1 | 8/2015 | Zambetti et al. | |

OTHER PUBLICATIONS

Chiu et al., "A Phase-Shifted Zero Voltage Transition Full-Bridge Converter with Current Doubler Synchronous Rectification," SICE Annual Conference in Sapporo, Aug. 4-6, 2004, Hokkaido Institute of Technology, Japan, pp. 60-65.

* cited by examiner

METHOD FOR DRIVING A RESONANT CONVERTER, AND CORRESPONDING CONVERTER AND COMPUTER PROGRAM PRODUCT

BACKGROUND

Technical Field

The present disclosure relates to resonant converters. More in particular, the disclosure regards techniques for driving a synchronous rectifier in a resonant converter.

Description of the Related Art

Power distribution in the field of servers and datacenters is undergoing continuous evolution. The continuous growth of these electronic devices requires maximization of the efficiency of the voltage converters that supply them in order to minimize the power required given the same power delivered, so as to limit thermal dispersion in the environments in which they are installed and hence the power used by the corresponding cooling equipment.

There exist various voltage-distribution systems, which are supplied by the mains voltage and convert it into the various voltage levels down to the voltage VCPU required by the processor. Currently, the mains voltage is converted into a first voltage distributed on a main supply bus, then converted into a second, lower, voltage (typically 12 V) distributed on an intermediate bus, and finally converted into the voltage VCPU for supply of the processors. To optimize the efficiency of the systems upstream of the processor, the main supply bus is at a voltage of 48 V.

However, some applications require direct conversion of the voltage from Vin=48 V to Vout=1.2 V, without passing through the intermediate conversion for the 12-V bus, for supplying CPUs and DDR (Double Data Rate) memories.

Other applications may, instead, require direct conversion between Vin=54 V and Vout=12 V.

BRIEF SUMMARY

In the scenario outlined previously, there is consequently felt the need for techniques for driving a synchronous rectifier that will enable improvement of the efficiency and reduction of electromagnetic interference.

This can be achieved by preventing current inversion in a device for driving a synchronous rectifier for a resonant voltage converter.

In particular, by preventing turning-on of the diodes a marked improvement of the efficiency is obtained due to the absence of losses due to the diodes within the transistors.

The object of one or more embodiments is to meet the above requirement.

One or more embodiments achieve the above object thanks to a method having the characteristics recalled in the ensuing claims.

The method for driving a resonant converter described herein comprises:

a primary switching circuit having at least a primary winding and a primary full-bridge switching stage, which is configured for driving the primary winding, and an inductor in series with the primary winding, a secondary resonant circuit having a secondary winding magnetically coupled to the primary winding, a resonance capacitor electrically connected in parallel to the secondary winding, a first secondary inductor and a second secondary inductor, each connected between an output terminal of the converter and a respective terminal of the resonance capacitor, a secondary rectification stage electrically connected in parallel to the resonance capacitor, which has a first switch and a second switch, each connected between a respective terminal of the resonance capacitor and ground, and a driving module, configured for receiving at input an enabling signal and the voltage measured across the switch of the secondary side, the driving module being configured for generating a control signal for controlling the switches of the secondary side.

The method comprises executing cyclically the following sequence of operations:

turning on low-side switches of the primary switching stage and both switches of the secondary rectification stage and turning off high-side switches of the primary switching stage;

after a fixed time, turning off the low-side switch and turning on the high-side switch of the primary switching stage;

waiting for a rising edge of the enabling signal;

waiting for the condition of zero current flowing in the switches of the secondary side to be satisfied;

turning off the first switch of the secondary side by sending the control signal to the low level after a variable delay with respect to the rising edge of the enabling signal, and keeping the second switch of the secondary side on;

waiting for the condition of zero voltage across the first switch of the secondary side to be satisfied; and switching back on the first switch of the secondary side by sending the control signal to the high level when the voltage measured across the first switch of the secondary side drops below a variable threshold; and executing the previous operations, reversing, with respect to one another, the roles of the high-side switches and low-side switches of the primary switching stage and reversing with respect to one another the roles of the first switch and second switch of the secondary rectification stage.

One or more embodiments may refer to a corresponding device, as well as a computer program product that that can be loaded into the memory of at least one computer device and comprises portions of software code for executing the steps of the method when the product is run on at least one computer. As used herein, reference to such a computer program product is understood as being equivalent to reference to a computer-readable means containing instructions for controlling the computer system in order to co-ordinate implementation of a method according to the embodiments of the present disclosure. Reference to "at least one computer device" is intended to highlight the possibility for the present disclosure to be implemented in a modular and/or distributed form.

The claims form an integral part of the description of one or more embodiments as provided herein.

BRIEF DESCRIPTION OF THE SEVERAL VIEWS OF THE DRAWINGS

One or more embodiments will now be described purely by way of non-limiting example, with reference to the annexed plates of drawings, wherein.

DETAILED DESCRIPTION

Illustrated in the ensuing description are one or more specific details, aimed at providing an in-depth understanding of various embodiments by way of example. The embodiments may be obtained without one or more of these specific details, or else with other methods, components, materials, etc. In other cases, known structures, materials, or operations are not represented or described in detail so that some aspects of the embodiments will not be obscured.

Reference to "an embodiment" or "one embodiment" in the context of the present description is aimed at indicating that a particular configuration, structure, or characteristic described in relation to the embodiment is comprised in at least one embodiment. Hence, phrases such as "in an embodiment" or "in one embodiment", or the like that may be present in one or more points of the present description do not necessarily refer to one and the same embodiment. Furthermore, particular configurations, structures, or characteristics may be combined in any adequate way in one or more embodiments.

The references used herein are provided simply for convenience and hence do not define the sphere of protection or the scope of the embodiments.

The present disclosure is based upon LLC converters, but may also possible be applied to other types of converters.

In various embodiments, the aim is to obtain driven turning-on and turning-off of the synchronous rectifier in an insulated resonant converter of a full-bridge type so as to prevent reversal of current.

By adapting some switch-on and switch-off thresholds of the transistors, it is possible to prevent the diodes within the transistors from turning on, i.e., from conducting and hence dissipating power. Consequently, keeping these diodes off enables elimination of the losses and improvement of the efficiency of the converter.

Figure 1:
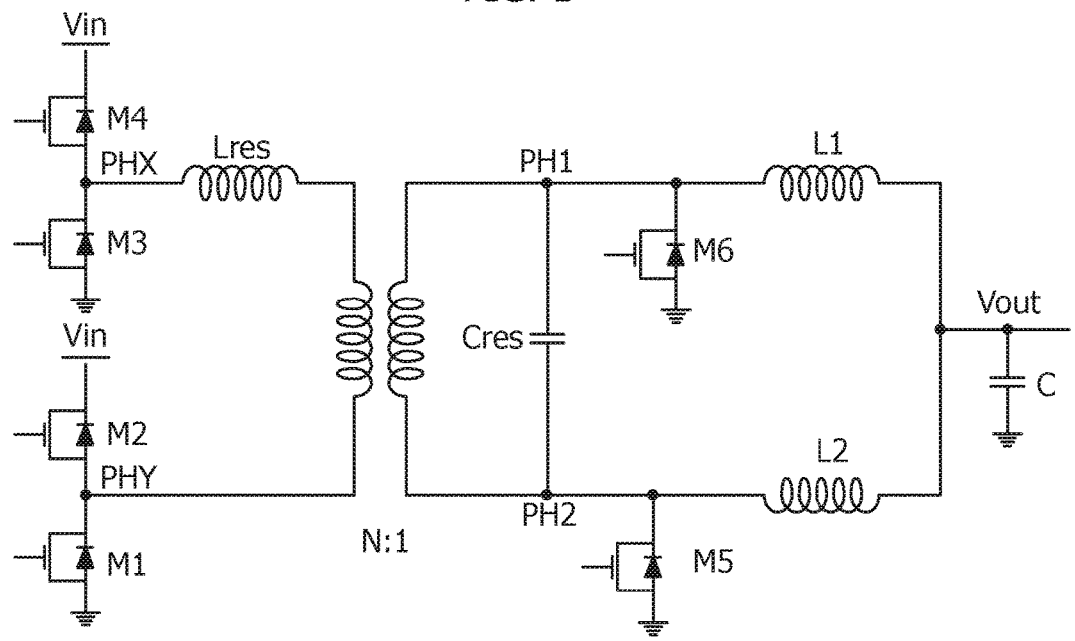
FIG. 1 shows a resonant converter.

The sphere of application of the solution described herein is synchronous rectification implemented in a resonant converter, the principle diagram of which is represented in FIG. 1.

General operation of this converter is divided into the following phases:

1. Low-side (LS) stop phase;
2. Pre-charging of inductor Lres through the diagonal on the terminal PHX;
3. Resonance of inductor Lres and capacitor Cres;
4. High-side (HS) stop phase;
5. Pre-charging of inductor Lres through the diagonal on the terminal PHY;
6. Resonance of inductor Lres and capacitor Cres;
7. New LS stop phase and repetition of the previous phases 1 to 6.

Operation of the circuit of FIG. 1 is cyclic, and phases 4, 5, and 6 are symmetrical with respect to phases 1, 2, and 3.

Starting from a condition where the high-side switches M2 and M4 of the primary side are on and the switch M5 on the secondary is operated, there will be described only the operating phases 1, 2, and 3, where the low-side switches M1 and M3 of the primary side are on and the first switch M6 on the secondary is operated.

In phases 4, 5, and 6, the roles of the high-side switches M2, M4 and low-side switches M1, M3 of the primary switching stage are reversed with respect to one another, and the roles of the first switch M6 and second switch M5 of the secondary rectification stage are reversed with respect to one another.

In the embodiments illustrated, the switches M1-M6 are obtained via transistors. For instance, in the embodiment proposed and illustrated in the figures, the switches are obtained with MOSFETs (Metal-Oxide-Semiconductor Field-Effect Transistors) used in on/off or switching mode. In the ensuing description the terms "switch" and "transistor" will be used indifferently, in so far as the transistors are made to work in their operating area in which they behave as switches.

Figure 2:
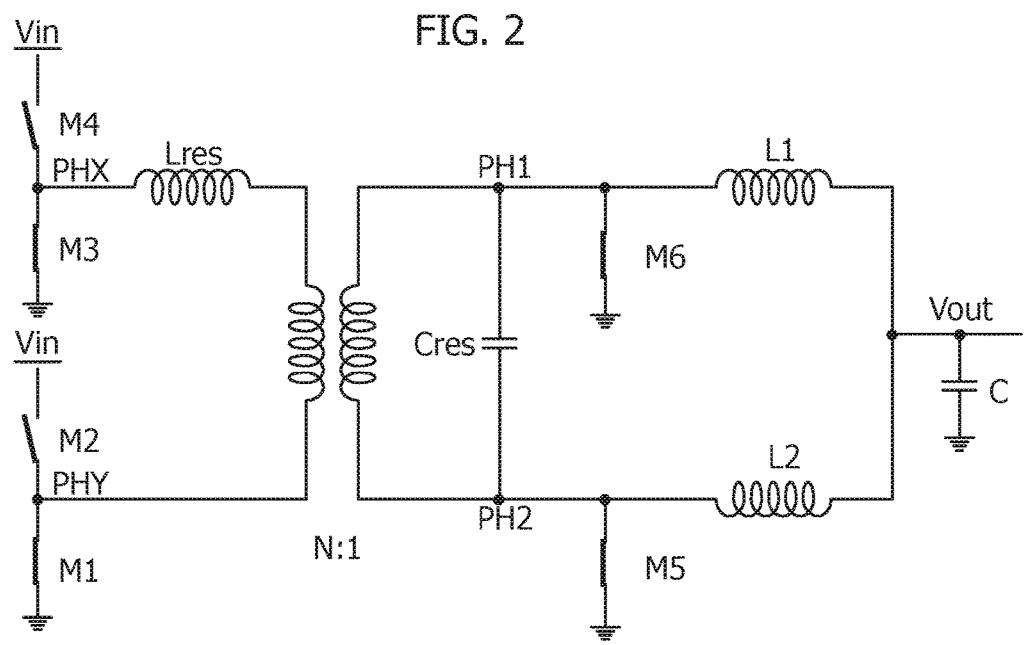
FIGS. 2, 3, 4, and 6 show different conditions of operation of the converter of FIG. 1.

Phase 1 of operation of the converter is represented in FIG. 2.

In this phase 1 (LS stop phase), the low-side MOSFET switches M1 and M3 on the primary are on (i.e., the switches are closed and enable passage of current) and also both of the MOSFET switches M5 and M6 on the secondary are on (i.e., closed).

In this situation (i.e., with M1, M3, M5 and M6 in the closed condition), on the primary there circulates a very small constant current designated by Istop, the sign of which depends upon the previous phase of the operating cycle, whereas on the secondary the current is mainly supplied to the load by the MOSFET switches M5 and M6. In fact, the current that arrives on the secondary from the primary is negligible, it being equal to Istop·N, with Istop≈0, where N is the transformation ratio.

Figure 3:
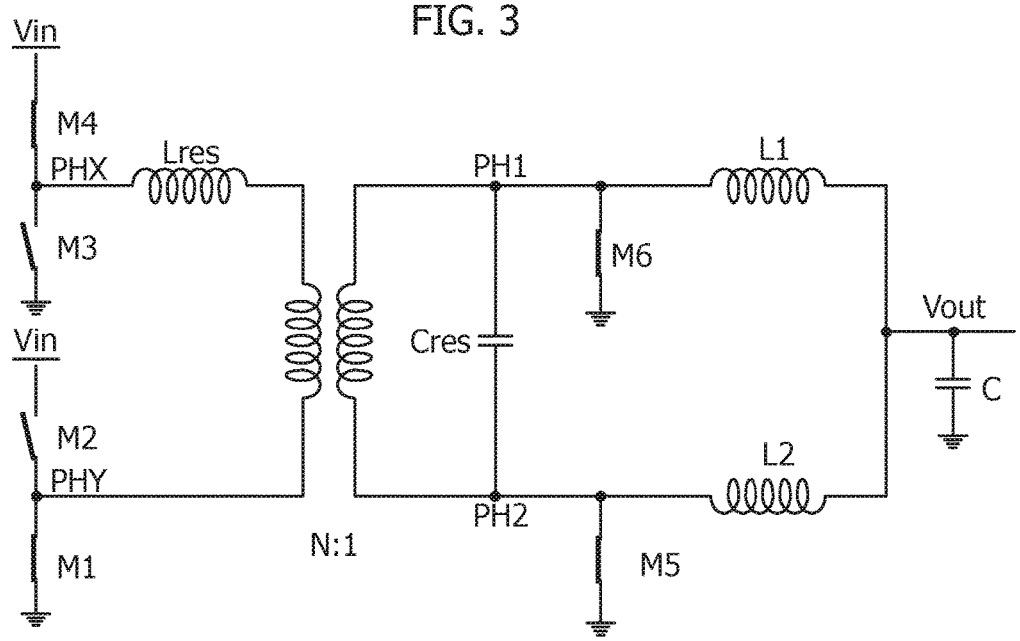

After a fixed time, phase 2 (pre-charging of inductor Lres through the diagonal on the terminal PHX) starts, where the diagonal on the terminal PHX is turned on; i.e., the switch M3 is turned off (rendering it an open circuit) and the switch M4 is turned on, as shown in FIG. 3, and the node PHX is brought to the voltage Vin.

The current in the inductor Lres grows linearly, and the current on the secondary, which is a replica of the current flowing in the inductor Lres increased N times (i.e., multiplied by the transformation ratio N), also increases linearly and adds to the current coming from the MOSFET switches M5 and M6 of the secondary to form the current Iload to be supplied to the load.

When the current on the secondary equals that of the load, the circuit is in the ZCD condition on the secondary, i.e., the condition of zero-crossing of the current circulating in the first MOSFET switch M6. In this condition, the current in the switch M6 is zero, and consequently the switch M6 turns off (i.e., it becomes an open circuit), and phase 3, of resonance between the inductor Lres and the capacitor Cres, starts.

Figure 4:
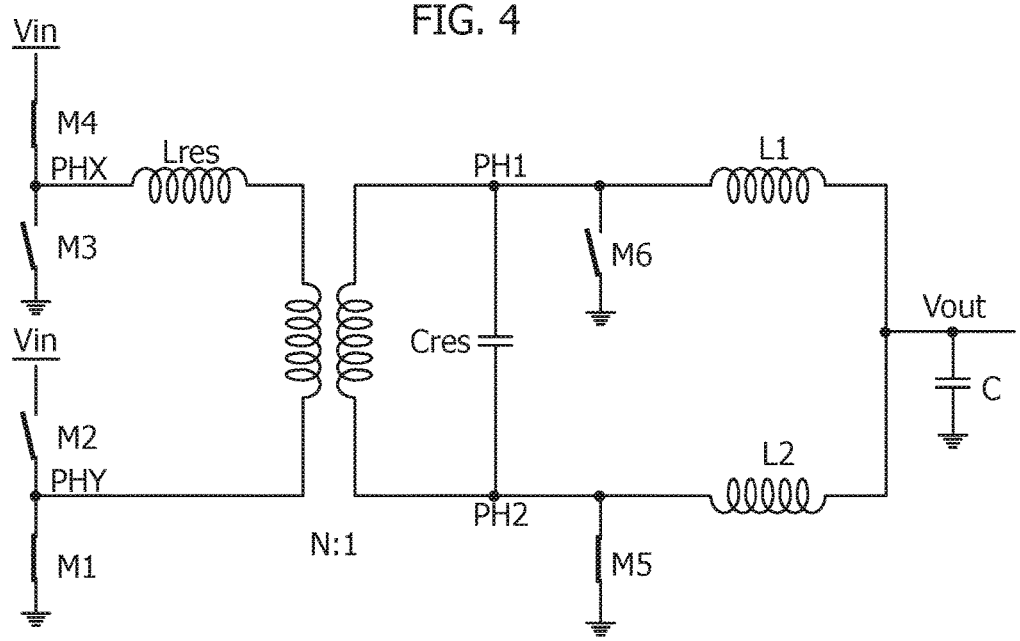
Figure 5:
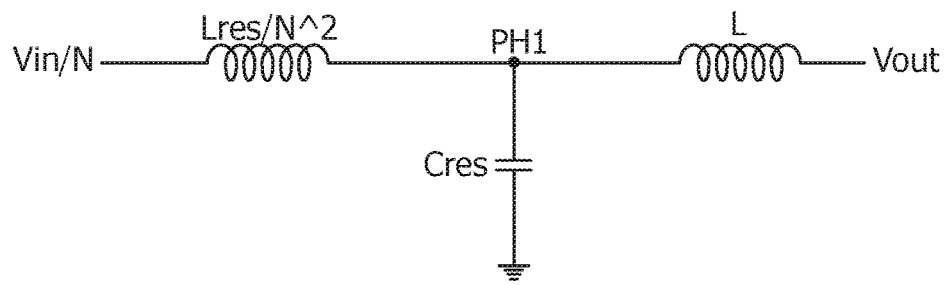
FIG. 5 shows the equivalent circuit in the condition of operation of FIG. 4.

Step 3 (resonance of inductor Lres and capacitor Cres) is represented in FIG. 4. Consequently, in the resonance phase 3, the circuit becomes equivalent to the one illustrated in FIG. 5.

During resonance (phase 3), there is an exchange of energy between the inductor Lres on the primary and the capacitor Cres on the secondary, and a phase bump is generated on the node PH1.

When the phase bump returns to 0 V, which is the ZVS condition, on the secondary, the switch M6 closes again.

Figure 6:
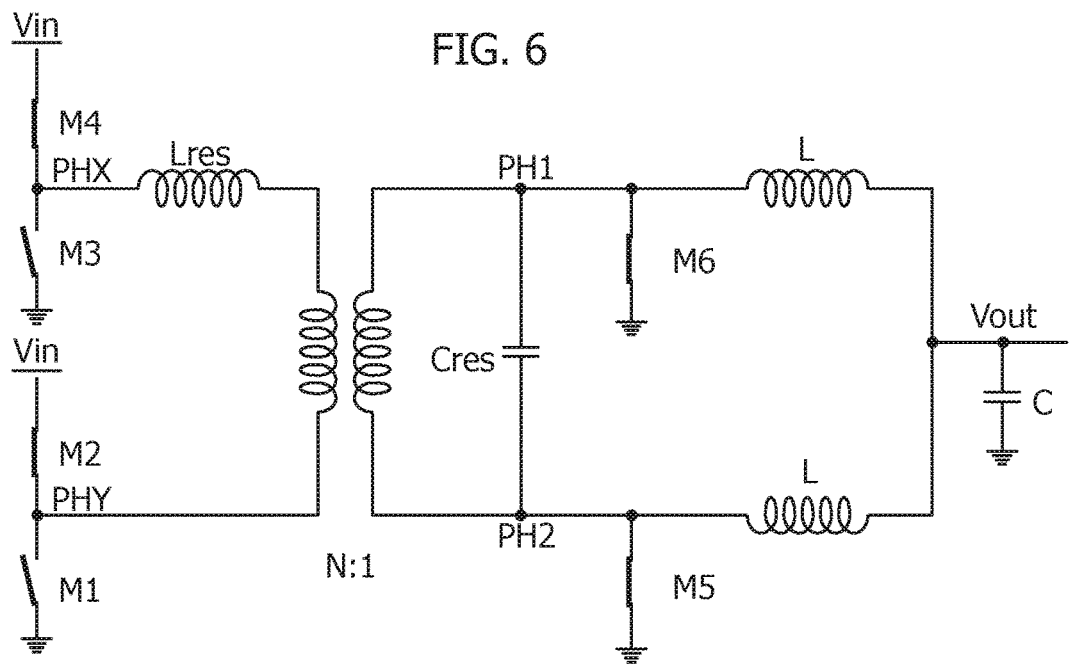

After a fixed time, phase 4 (HS stop phase) represented in FIG. 6 starts, where the switch M1 is turned off (i.e., it behaves like an open circuit) and the switch M2 is turned on (i.e., the circuit is closed, thus becoming a short-circuit). In this condition, the high-side MOSFET switches M2 and M4 are on, and a current Istop starts to circulate in the primary: this current has an absolute value equal to that of phase 1, but of opposite sign.

From this point on, the cycle repeats symmetrically in phases 4, 5, and 6 with turning-off, when the ZCD condition is satisfied, and turning-on, when the ZVS condition is satisfied, of the other MOSFET switch M5 on the secondary.

Without entering into greater detail of operation of the resonant converter and its sizing, it should be noted that, on the secondary, a synchronous rectification is carried out on the switches M5 and M6 obtained with MOSFETs, where ideally the aim is to turn off each of them in the ZCD condition, i.e., in a condition of zero current flowing in the MOSFET switches, and to turn them back on in the ZVS condition, i.e., in a condition of zero voltage across the MOSFET switches.

This behavior is fundamental in all the applications where a high conversion efficiency is required. In fact, proper turning-off of the MOSFET switches in the ZCD condition and proper turning-on in the ZVS condition in the synchronous rectifier on the secondary of a resonant converter, makes it possible to prevent the body-drain diodes of the MOSFETs of the rectifier (i.e., the transistors M5 and M6) from ever turning on, thus preventing large losses in terms of efficiency.

Figure 7:
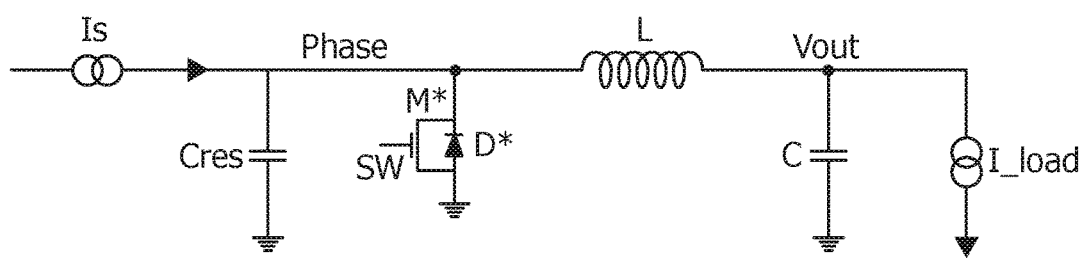
FIG. 7 shows the branch of the secondary of the resonant circuit of FIG. 1.

Representing the secondary branch of the resonant circuit of FIG. 1 by means of the principle diagram of FIG. 7, it is hence essential to carry out proper turning-on and proper turning-off of the power MOSFET M* (which, according to the particular phase, may be either M6 or M5) via the control signal SW sent at input to its gate terminal, so that in the transistor M* the body-drain diode designated by the reference D* never goes into conduction, thus avoiding losses in power conversion.

In different phases of the method, the transistor M* may alternatively be the first transistor M6 or the second transistor M5 of the secondary.

There follows a detailed explanation of how the introduction of some parameters, listed hereinafter, can give rise to a system that carries out turning-on and turning-off of the switch M* so as to prevent in all cases, precisely because it is a system of an adaptive type, turning-on of the body-drain diode D* of the transistor M*, independently both of the working conditions (temperature, current loads) and of the external elements (inductances, capacitances) and parasitic elements.

The additional parameters are:
a signal START synchronized with the generator of current Is;
an adaptive ZCD (Zero-Current Detection) module ADAPTIVE ZCD;
an adaptive ZVS (Zero-Voltage Switch) module ADAPTIVE ZVS; and
a logic module LOG, which manages the sequence of the events and the communication between the modules ADAPTIVE ZCD and ADAPTIVE ZVS and a driver DRIVER, which generates the effective control signal SW that is sent to the input of the gate terminal for driving the transistor/switch M*.

Figure 8:
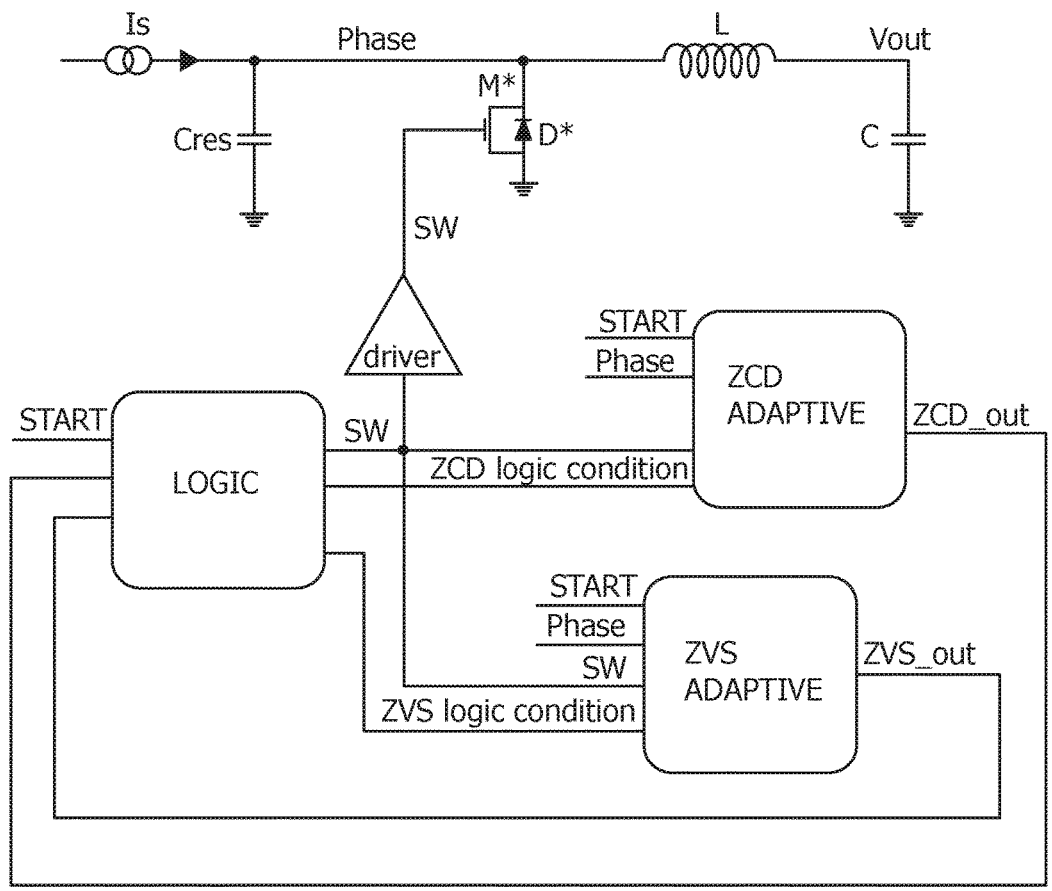
FIG. 8 shows the general diagram of the driving module of the resonant converter.

Represented in FIG. 8 is the general diagram of an embodiment.

Particular attention should be paid to the following parts that are represented in FIG. 8:
a signal START, which is a signal synchronized with the start of the rising edge of the generator current Is (the signal Is is, for example in full-bridge applications, a triangular signal);
an adaptive ZCD module synchronized with the signal START, which makes it possible to obtain the ZCD condition (i.e., generation of the signal ZCD_out at output from the ZCD module) where turning-off of the transistor M* occurs without turning-on of the diode D* and hence exactly when the current flowing in the transistor M* crosses the zero (0 V), adapting to the conditions of operation, to the external elements, and to the parasitic loads;
an adaptive ZVS module synchronized with the signal START, which, in appropriate logic conditions, makes it possible to obtain the ZVS condition (i.e., generation of the signal ZVS_out at output from the ZVS module) where turning-on of the transistor M* occurs without turning-on of the diode D* and hence exactly when the voltage Phase (measured across the transistor M*) crosses the zero (0 V), adapting to the conditions of operation, to the external elements, and to the parasitic loads;
a logic module LOG, which, on the basis of the signal START, of the signals ZCD_out and ZVS_out, and of other signals of communication between the logic module LOG and the modules ADAPTIVE ZCD and ADAPTIVE ZVS, guarantees the correct sequence of the events (as will be described in detail hereinafter) and then communicates to the driver DRIVER, which effectively drives the gate terminal of the transistor M*, the exact moment of turning-off and turning-on so as to prevent turning-on of the diode D* within the transistor M*.

Figure 9:
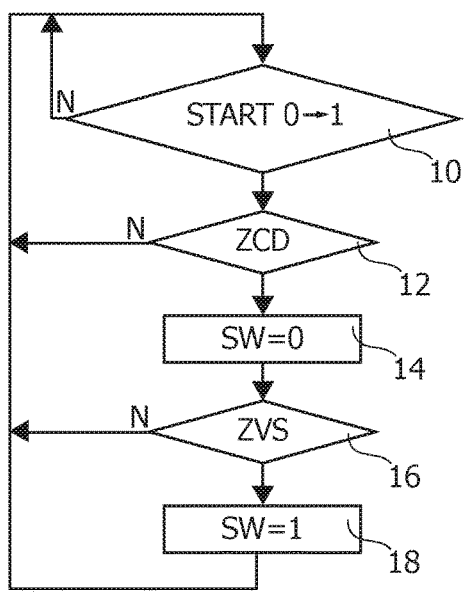
FIG. 9 is a flowchart of the steps for driving the resonant converter.

On the basis of this general scheme, the logic flow by means of which turning-off and turning-on of the transistor M* is carried out, is illustrated in the flowchart of FIG. 9.

In a first step 10, the rising transition of the signal START from the low level "0" to the high level "1" is monitored, and, as soon as this occurs, control passes to step 12 awaiting arrival of the signal ZCD_out for the transistor M* to be turned off. When the signal ZCD_out arrives, control passes to step 14 and the signal SW="0" is generated, which is sent at input to the gate terminal of the transistor M*. This signal SW is the signal for driving the transistor M*.

Control then passes to step 16 awaiting arrival of the signal ZVS_out for the transistor M* to be turned back on. When the signal ZVS_out arrives, control passes to step 18 where the control signal SW is brought to the high level ("1"), which may, for example, correspond to 5 V, and is sent at input to the gate terminal of the transistor M*.

At this point, the falling transition of the signal START from the high level to the low level (i.e., from "1" to "0") is monitored, this being the phase where the transistor M* remains on (i.e., it behaves like a closed switch) and start of the next cycle of the signal START is monitored, i.e., the next rising transition of the signal START from the low level "0" to the high level "1", for reiterating the flow of FIG. 9 just described.

In particular, the high level "1" may correspond, for example, to 5 V.

During the steps described by the flowchart of FIG. 9, the finite-state machine present in the logic module LOG communicates with the modules ADAPTIVE ZCD and ADAPTIVE ZVS to guarantee the correct sequence of the events. In particular, it is primarily necessary to verify that, before the ZVS event, the ZCD event has occurred, and at the same time that an entire series of conditions on the phase bump that is created after turning-off of the transistor M* are satisfied, so as to make sure that the ZVS module operates in the area of the phase bump where it should. In practice, control passes to step 16 of the flowchart only and exclusively after the condition in step 12 (arrival of the signal ZCD_out) has been satisfied.

Figure 10:
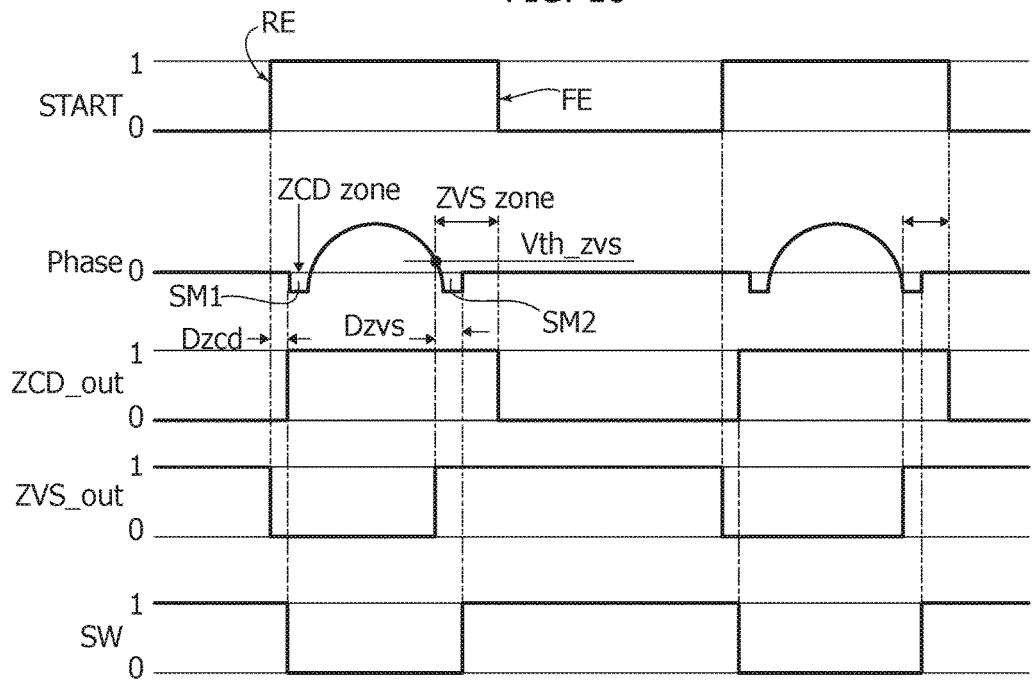
FIGS. 10 and 11 are timing charts of the main signals that flow in the converter.

Represented in FIG. 10 are the timing charts of the signals START, Phase, ZCD_out, ZVS_out, and SW in two generic cycles of the signal START, which can be considered as a clock of the system.

It may be seen that at the low-to-high transition ("0"→"1") of the signal START, the transistor M* is on (i.e., it corresponds to a short-circuit), and the value of the voltage Phase is equal to $I_{m1} \cdot Rdson_{m1} \approx 0$. In this step, it is the ZCD module that operates, in so far as it is necessary to issue a command for turning-off of the transistor M*, which ideally must occur when the current in the transistor M* reaches zero "0".

The ZCD module seeks this point, introducing a delay Dzcd with respect to the low-to-high transition ("0"→"1") of the signal START, this delay being zero at the beginning and cycle after cycle increasing until the ZCD condition, where the diode D* does not turn on, obtains. This condition where the diode D* does not turn on is represented by the absence of an under-voltage SM1 of the signal Phase at the moment when the transistor M* is turned off (passage of the signal SW from high to low, "1"→"0").

Also in this case, the high level "1" may correspond, for example, to the voltage level of 5 V.

FIG. 10 represents a generic cycle of the signal START where this condition has not yet been reached. After a delay Dzcd, the signal ZCD_out passes from the low level to the high level ("0"→"1"): this is the signal ZCD_out that imposes turning-off of the transistor M* (i.e., control signal SW at input to the gate terminal set at zero—SW: "1"→"0"), but, as may be clearly seen, the under-voltage SM2 due to turning-on of the diode D* persists.

Only after reversal of the current $I_{m1}$ flowing in the transistor M* (a condition that obtains when the current Is becomes greater than the current Iload) will the diode D* turn off, and will there be formation of the phase bump due to resonance.

At this point, the finite-state machine of the logic module LOG intervenes, which verifies: the shape of the phase bump; the maximum peak of the phase bump; and the duration of the phase bump. Via these data and once the finite-state machine has ascertained that the ZCD event has occurred, the ZVS module intervenes.

Intervention of the ZVS module ideally occurs with turning-on of the transistor M* exactly when the phase bump returns to 0 V. The ZVS module detects this condition as the point of interception of the signal Phase, in the descending portion of the phase bump, with the threshold Vth_zvs. Once signal Phase intercepts this threshold, the signal ZVS_out passes from the low level to the high level ("0"→"1"), and this determines the signal that drives the transistor M* back on (SW: "0"→"1"), which occurs after a fixed delay Dzvs.

This threshold Vth_zvs at the start is approximately 0 V and at each cycle is increased so as to anticipate the instant when the transistor M* is turned back on until this occurs exactly when the signal Phase passes through 0 V.

FIG. 10 represents a generic cycle of the signal START in which this condition has not yet been reached and the value of the threshold Vth_zvs is such that, when the transistor M* is turned back on, the diode D* is still in time to switch on, as may be seen from the formation of the under-voltage SM2 on the phase bump before the transistor M* is turned back on (SW: "0"→"1").

In FIG. 10, it may be seen that the falling edge FE of the signal START resets the signal ZCD_out and sends it to the low level (0 V), and likewise the rising edge RE of the signal START resets the signal ZVS_out and sends it to the low level (0 V).

Consequently, once the transistor M* has switched back on, it remains in this condition up to the next rising edge RE of the signal START, and then the cycle described can repeat.

At each cycle, the delay Dzcd with which M* is turned off is increased and also the threshold Vth_zvs is increased until a condition of equilibrium is reached where the diode D* does not switch on. In particular, the diode D* remains off both in the initial portion of the phase bump and in the final portion.

Figure 11:
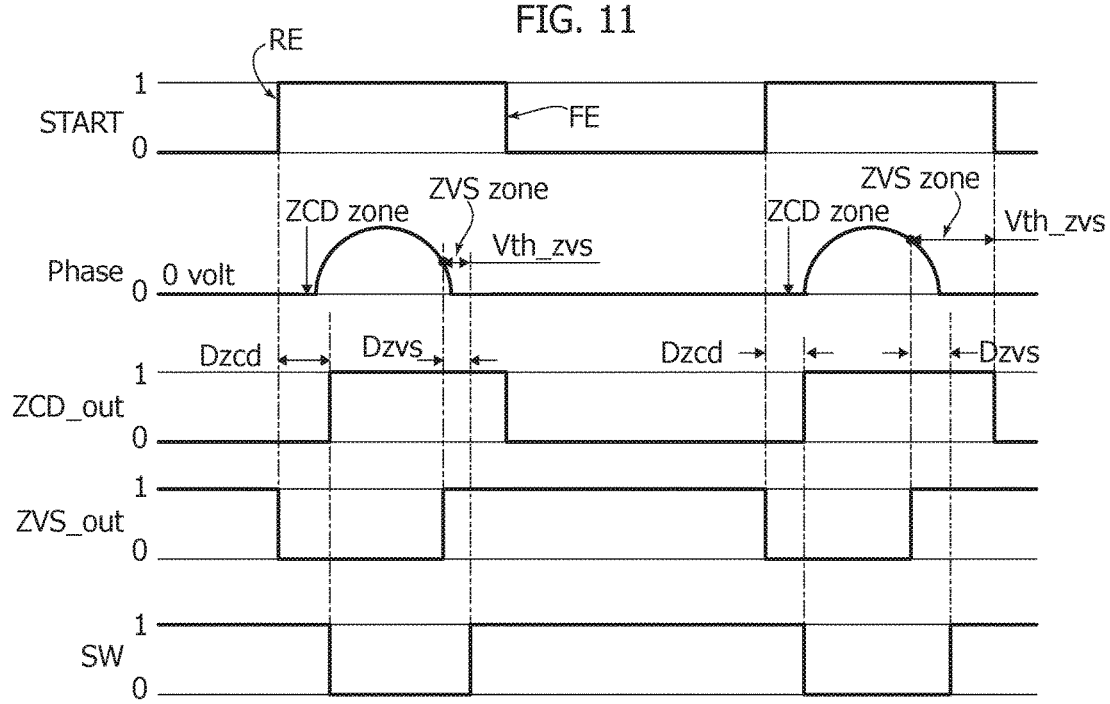

When this state of equilibrium is reached, it effectively means that the ideal condition has been reached whereby the ZCD event occurs at the moment when the transistor M* is turned off and the ZVS event occurs at the moment when the transistor M* is turned back on. In this situation, there will hence be no formation of under-voltages in the initial portion SM1 and in the final portion SM2 of the phase bump, as may be seen in FIG. 11. FIG. 11 consequently represents a condition of equilibrium in which the diode D* of the transistor M* is not switched on, and maximum efficiency is obtained.

The condition whereby the diode D* is never switched on coincides with elimination of the under-voltages of the signal Phase in the initial portion and final portion of the phase bump.

Consequently, the idea that underlies the adaptive ZCD and ZVS modules consists in observing the under-voltage SM1 in the initial portion of the phase bump just after the transistor M* is turned off, as regards ZCD, and of the under-voltage SM2 in the final portion of the phase bump just before the transistor M* is turned back on, as regards ZVS.

There will now follow a detailed description of how, from this monitoring of the under-voltages, the ZCD and ZVS modules implement a process of analog integration on the under-voltages themselves, in the initial portion of the phase bump for ZCD and in the final portion for ZVS and how, from this process, the two modules calculate, cycle after cycle, the appropriate delay Dzcd and the appropriate threshold Vth_zvs to reach the condition of equilibrium described and represented in FIG. 11.

Operation of the adaptive ZCD module is described in detail in what follows.

As has already been said previously, this ZCD module introduces a delay with respect to the rising edge RE of the signal START to be understood as delay in turning-off of the transistor M* after transition of the signal START from the low level to the high level ("0"→"1"). This delay is processed, at each cycle of the signal START, starting from a zero delay until the condition of equilibrium is reached that represents the ZCD condition, i.e., the condition where the transistor M* switches off at zero current, which occurs, with reference to FIG. 7, when Is=Iload.

Figure 12:
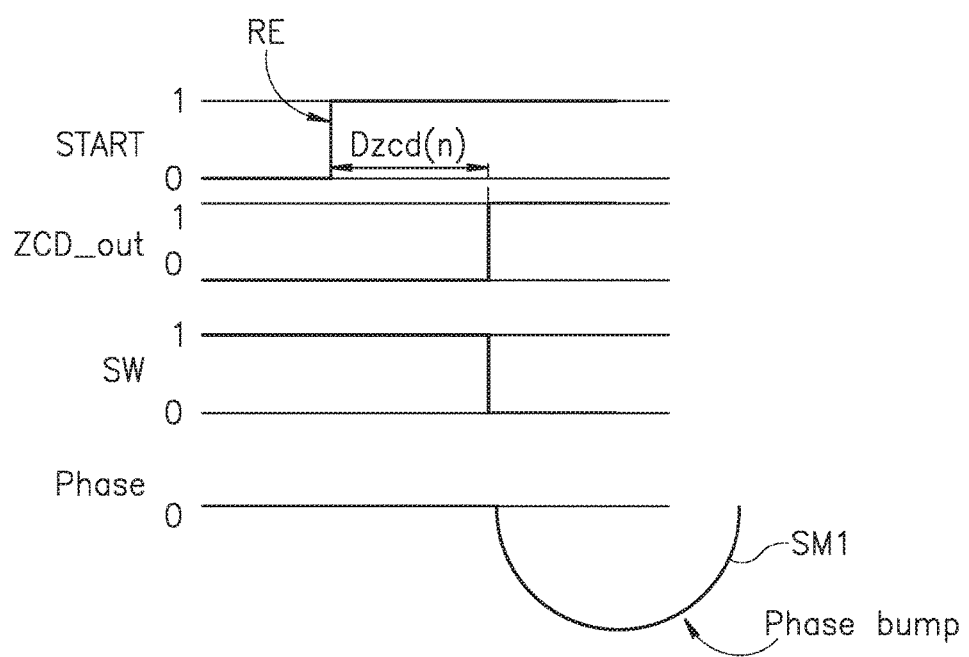
FIG. 12 shows an enlarged detail of the charts FIG. 10.

Considering an n-th cycle of the signal START, denoted by n, where the ZCD condition has not yet been reached, the delay introduced in this cycle by the adaptive ZCD module is shown in FIG. 12, which also represents the signal START in the low-to-high transition ("0"→"1"), the signal ZCD_out at output from the adaptive ZCD module, the control signal SW for controlling turning-off of the transistor M*, and the signal Phase in its initial portion just before and just after turning-off of the transistor M*.

As may be seen in FIG. 12, from the rising edge RE of the signal START, after a delay Dzcd(n) that the adaptive ZCD module has calculated in the n−1 previous cycles, the signal ZCD_out goes to the high level, and the transistor M* is turned off by sending the signal SW to the low level (0 V) ("1"→"0").

At this point, since the condition where Is=Iload has not yet been reached, the diode D* switches on and the voltage on the node Phase goes from the value $I_{m1} \cdot Rdson_{m1} \approx 0$ V to the under-voltage value of approximately −0.7 V (forward voltage of the diode). At this point, the adaptive ZCD module carries out an integration of the under-voltage of the signal Phase in order to process the delay Dzcd(n+1) that the module itself will introduce at the next (n+1)-th cycle of the signal START.

This delay may be expressed as:

$$Dzcd(n+1)=Dzcd(n)+\Delta zcd(n)-\delta \quad (1)$$

where $\Delta zcd(n)$ is the variation of the delay processed by the under-voltage-integration process, and $\delta$ is a small advance added at each cycle.

This small advance $\delta$ has been introduced to render the process bidirectional. In fact, on the one hand a condition of equilibrium will be reached when the residual under-voltage is so small and insufficient to switch the diode D* on and such that the variation of delay processed at this point, which we may call $\Delta zcdeq$, is approximately equal to $\delta$, but at the same time, if the conditions of the system change and, for a given situation of equilibrium, under-voltage is no longer created, by means of the small time advance $\delta$ the system can go back to smaller values of delay.

Obviously, also protections have been implemented such that, in the case where the system were to vary its condition a lot and were to return instantaneously to a zero delay, then instantaneously the delay is reset to the initial conditions by means of a resetting function. This is done by analyzing the derivative of the ascending stretch of the phase bump in the initial portion after turning-off of the transistor M* and, if the above derivative is beyond a certain limit, this situation is communicated to the logic LOG, which, after a certain number of consecutive cycles in which the same condition repeats, it communicates to the ZCD module the need for a reset.

Figure 13:
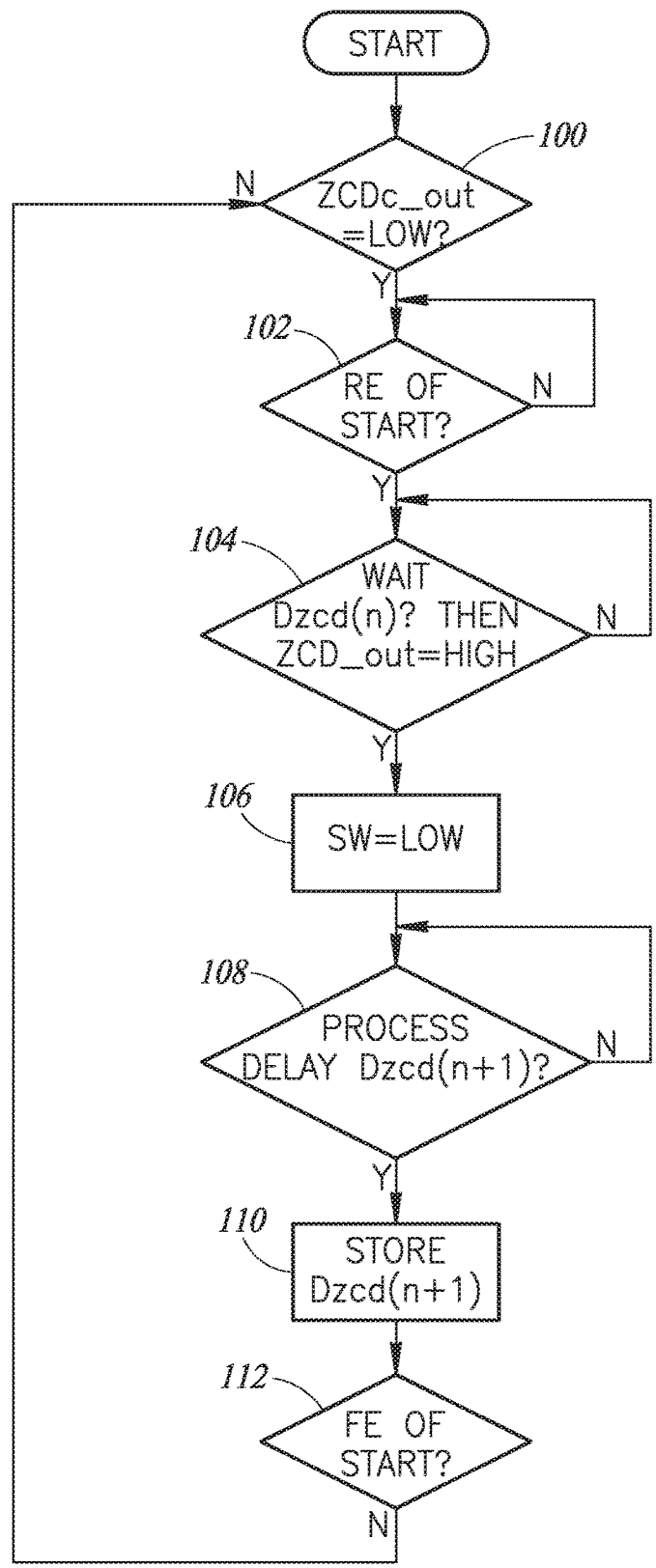
FIG. 13 shows a flowchart of the steps of the ZCD (Zero-Current Detection) module.

FIG. 13 shows the flowchart regarding the operations that the adaptive ZCD module performs at each cycle of the signal START.

In a step 100, a check is made to verify whether the signal ZCDc_out at output from the ZCD module is at the low level (0 V). If it is, in step 102 arrival of the rising edge RE of the signal START is monitored. Upon arrival of the rising edge, control passes to step 104, where, after a wait time interval equal to Dzcd(n), the signal ZCD_out, at output from the ZCD module, is brought to the high value, for example 5 V.

When this situation occurs, in a step 106 the control signal SW to be sent to the gate of the transistor M* is set at the low level (SW=0 V). In a step 108, the ZCD module processes the delay Dzcd(n+1). In the next step 110, the value of the delay Dzcd(n+1) is stored for the next cycle. In step 112, arrival of the falling edge FE of the signal START is monitored, and, upon its arrival, control returns to step 100, where the signal ZCD_out at output from the ZCD module is set at the low level (SW=0 V). At this point, control returns to step 100 where a check is made to verify whether the signal ZCDc_out at output from the ZCD module is at the low level (0 V).

At this point, it is evident how the heart of the adaptive ZCD module is the analog loop with which, at each cycle, the variation of delay $\Delta zcd$ and the small advance $\delta$ are processed and how these two elements $\Delta zcd$ and $\delta$ are added together and stored to give rise to the delay Dzcd to be introduced at the next cycle.

Figure 14:
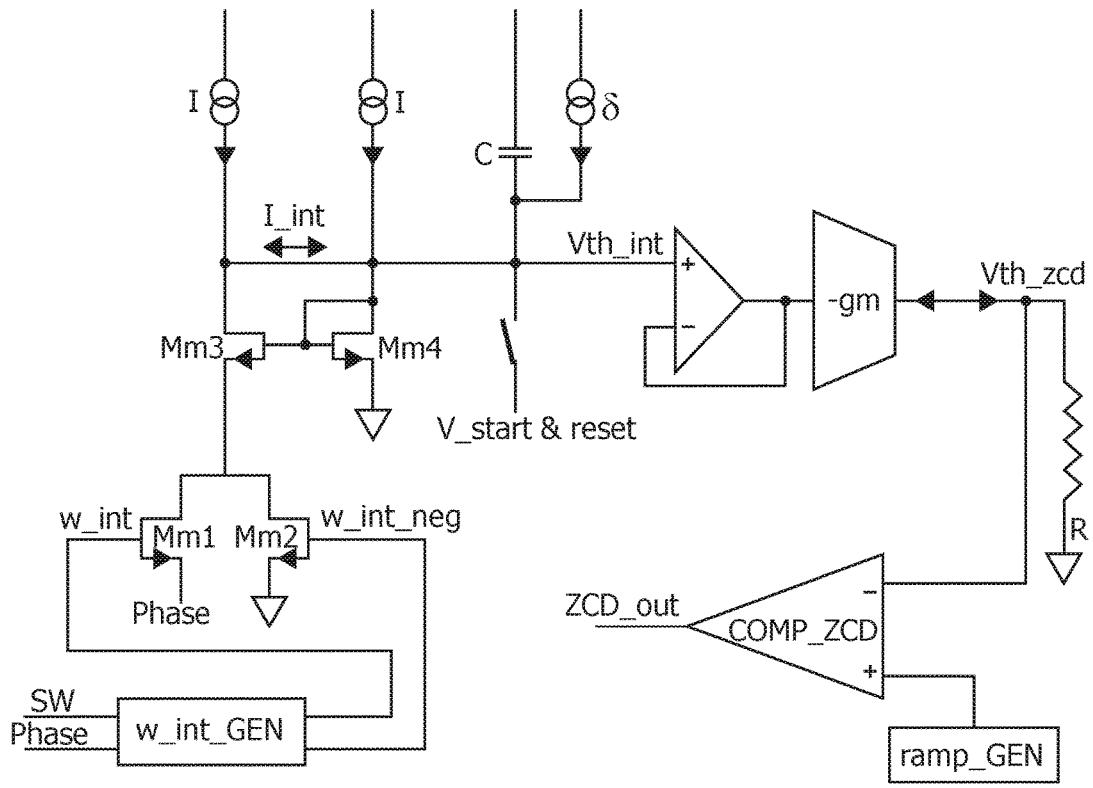
FIG. 14 shows a possible implementation of the ZCD module.

The general scheme of this analog loop is illustrated in FIG. 14.

To understand how this loop generates the delay Dzcd, it is necessary in the first place to consider that it is processed by integrating the under-voltage that is generated on account of a possible switching-on of the diode D*, after turning-off of the transistor M* that occurs when the control signal SW sent to its gate passes from the high level to the low level ("1"→"0").

Hence, first of all it is necessary to define an integration window that identifies the time interval within which to make the integration.

Figure 15:
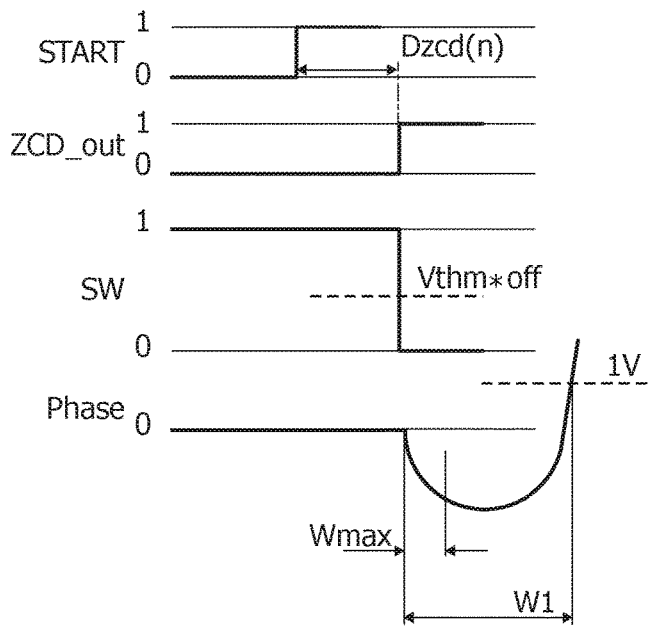
FIG. 15 shows an enlarged detail of the charts FIG. 10.

From an observation of FIG. 14, it is the module w_int_GEN that identifies the time interval within which to make the integration; the module w_int_GEN monitors the control signal SW and the signal Phase. When the control signal SW drops below a fixed threshold referred to as Vthm*off, below which the transistor M* may be considered off, the module w_int_GEN waits for the signal Phase to return above 1 V. If this time interval, denoted by W1, is shorter than a pre-set maximum time interval Wmax, then the integration window is defined as Wint=W1; otherwise, Wint=Wmax. FIG. 15 represents the case where Wint=Wmax.

During the time interval Wint, the signal w_int goes to the high level (for example, 5 V) and its negated version w_int_neg goes to the low level (0 V). Hence, in FIG. 14, the transistor Mm1 turns on and the transistor Mm2 turns off; consequently, during the time interval Wint, Vgs3=Vgs4+ Phase, and hence a current signal I_int is generated, which is weighted by the transconductance of the transistor Mm3 and the direction of which depends upon the sign of the signal Phase. In particular, a negative signal Phase generates discharge of the capacitance C that had initially been pre-charged to an appropriate initial value V_start. At the same time, at the end of the time interval Wint, this same capacitance C is charged with an extremely small fixed current pulse. There has thus been generated a variation of the threshold Vth_int at each cycle of the signal START obtained via analog integration of the signal Phase for a time equal to Wint. Hence, at the generic cycle of the signal START we can write $$\Delta Vth\_int = \left( \frac{Phase \cdot gm3 \cdot Wint}{C} + \frac{\delta \cdot Wint}{C} \right) \quad (2)$$

The first term of the sum of Eq. 2 is due to integration of the signal Phase and, for a negative signal Phase, gives rise to discharge of the capacitance C at each cycle of the signal START. The second term of the sum of Eq. 2 gives rise to a fixed charging of the capacitance C at each cycle of the signal START, whereas between one cycle and the next the capacitance maintains the threshold value reached.

Figure 16:
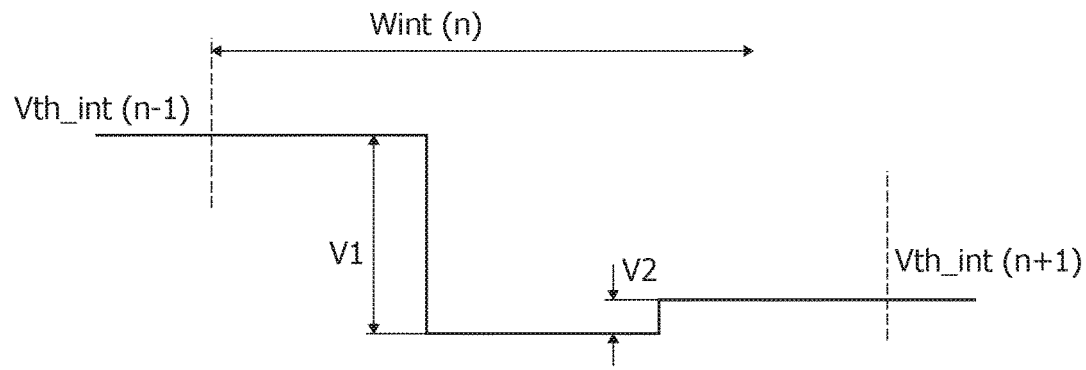
FIGS. 16, 17, and 18 show timing charts that illustrate how to determine the value of the delay.

This is represented in FIG. 16, where the threshold Vth_int(n−1) has been processed in the n−1 previous cycles, and during the n-th cycle the threshold to be used in the (n+1)-th cycle is processed.

In FIG. 16, denoted by V1 is the variation due to the signal Phase, whereas denoted by V2 is the variation due to the small advance S.

To transform this threshold into a delay, first it is amplified by an appropriate negative gain −gm·R, so that a new threshold Vth_zcd is obtained that is an amplified version of Vth_int with opposite sign. Consequently, to an under-voltage of the signal Phase there will correspond an increment of the threshold Vth_zcd equal to $$\Delta Vth\_zcd = -gm \cdot R \cdot \left( \frac{\text{Phase} \cdot gm3 \cdot Wint}{C} + \frac{\delta \cdot Wint}{C} \right) \quad (3)$$

Figure 17:
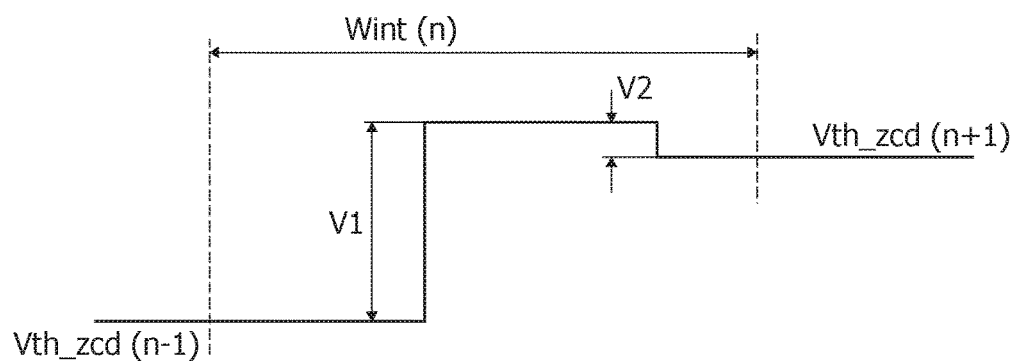

This is represented in FIG. 17.

Finally, the threshold Vth_zcd at each cycle is compared with a ramp that increases always with a constant slope starting from a value fixed by the instant of the rising edge RE of the signal START and reset at the falling edge FE of the signal START.

The output of the comparator COMP_ZCD that makes this comparison, as appears from FIG. 14, is the output signal ZCD_out of the ZCD module, which occurs after a delay that is the longer, the higher the value reached by the threshold Vth_zcd, which depends upon the integrations of the signal Phase in the previous cycles, as explained above.

Figure 18:
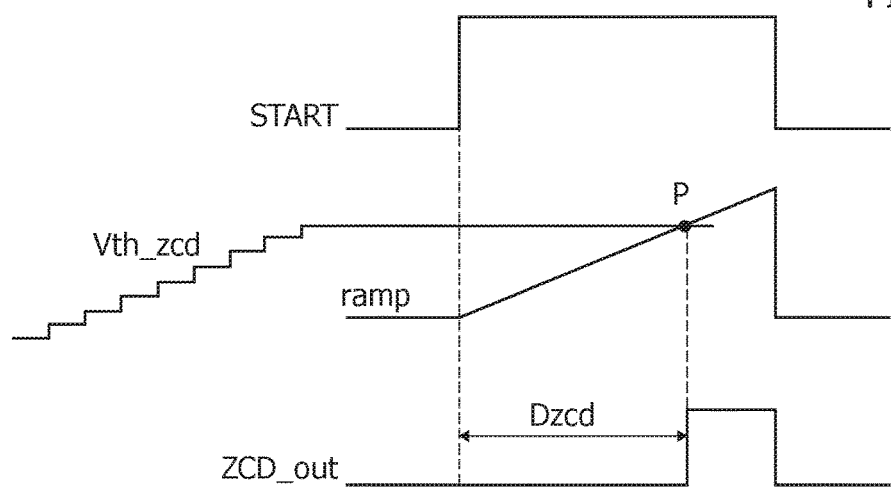

FIG. 18 shows generation of the delay Dzcd obtained via the comparison of the threshold Vth_zcd with the ramp with constant slope.

At a certain point P, a condition will be reached whereby the under-voltage of the signal Phase will be so small in amplitude and duration that the positive variation of the threshold Vthzcd will be equal to the negative variation due to the small current pulse S. The value of delay corresponding to this threshold is the one reached for eliminating the under-voltage without the diode D* switching on, and the delay must not be increased beyond this value to prevent the transistor M* from being turned off with a current already inverted and excessively high; in other words, the ZCD condition has been reached.

On account of the way in which this delay has been obtained, as the conditions of the system or of the parasitic or external elements vary, this delay will adapt to the new condition of equilibrium of the ZCD module with a speed that depends upon the band of the analog components that are used to obtain it and upon the working frequency of the system clock, which is the signal START.

The adaptive ZVS module, as has been said previously, acts on the final portion of the phase bump to guarantee that the transistor M* will be turned back on exactly when the ZVS event occurs, i.e., when the drain-to-source voltage of the MOSFET M* is zero (Phase=0 V).

The circuits that turn the transistor M* back on present an intrinsic delay, and this delay has a process spread that may vary during operation according to the temperature. Furthermore, the slope of the signal Phase in its descending stretch depends upon the conditions of load, upon the parasitic and external elements, as well as upon the temperature, and it is consequently difficult to obtain a ZVS condition by setting, for example, a fixed threshold for the signal Phase, beyond which the transistor M* is turned back on.

Figure 19:
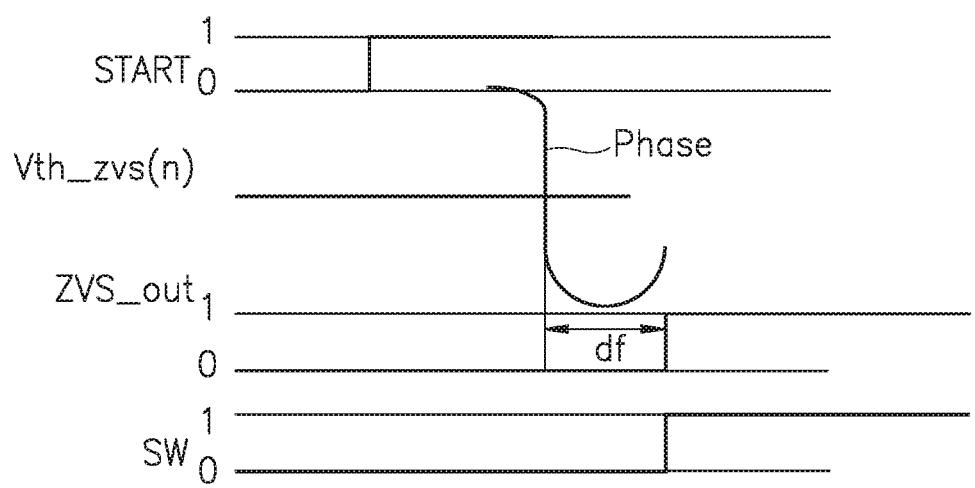
FIG. 19 shows an enlarged detail of the charts of FIG. 10.

In fact, as may be noted in FIG. 19, for a generic cycle n of the signal START, the adaptive ZVS module implements a variable threshold that starts from an initial threshold value close to 0 V and increases so as to anticipate progressively the instant at which the transistor M* is turned back on, until the condition is reached where it is turned on at zero voltage without the diode D* switching on; the process must not go any further in order to prevent the transistor from being turned on too early, that is before the signal Phase has reached the level of 0 V.

In particular, FIG. 19 represents the situation where the ZVS condition has not yet been reached. In fact, after the signal Phase has crossed the threshold Vthzvs, the transistor M* turns back on after the fixed delay df due to the internal circuitry, but the signal Phase presents an under-voltage due to switching-on of the diode D*.

Integration of this under-voltage, in a way altogether similar to what has been described for the ZCD process, will determine an increase of the threshold to be used in the next cycle of the signal START, and hence the transistor M* will be turned back on in advance, thus reducing conduction of the diode D* and thus the under-voltage determined thereby.

In particular, we have:

$$Vthzvs(n+1)=Vthzvs(n)+\Delta vthzvs(n)-\delta vth \quad (4)$$

i.e., the threshold at the next cycle n+1 is equal to that of the current cycle, added to which is a contribution Δvthzvs(n) due to integration of the under-voltage of the signal Phase, from which a small fixed threshold value δvth is subtracted.

Figure 20:
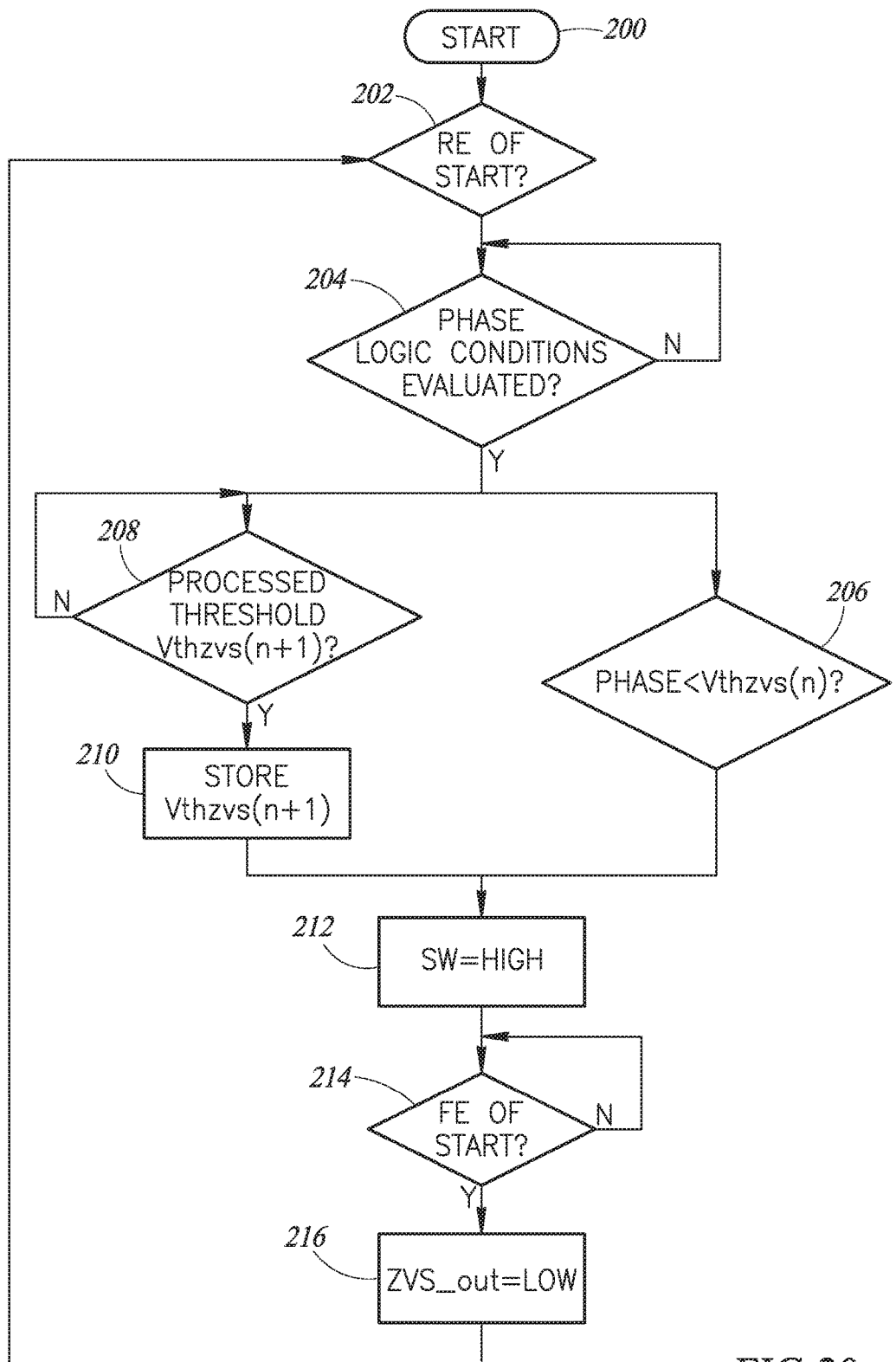
FIG. 20 shows a flowchart of the steps of the ZVS (Zero-Voltage Switch) module.

FIG. 20 represents the logic flow that the ZVS module performs at each cycle of the signal START.

With particular reference to FIG. 20, present in the flow of the ZVS module are logic conditions of communication between the ZVS module ZVS ADAPTIVE and the logic module LOG that ensure that the descending region of the phase bump where the ZVS condition is to be sought has been reached. The above conditions are also important for determining the ZVS integration window. For the rest, the logic flow is very similar to that of the ZCD module.

In step 202, arrival of the rising edge RE of the signal START is monitored. Upon its arrival, control passes to step 204, where the logic conditions for the descending portion of the signal Phase are evaluated. At this point, control executes in parallel the activities of step 206 and step 208. In step 206, the condition Phase<Vthzvs(n) is evaluated after the delay df, and, in the case of positive outcome, the output of the ZVS module is sent to the high value (1 V). Simultaneously, in step 208, the ZVS module processes the threshold Vthzvs(n+1) for the next cycle. In step 210, the value calculated for the threshold Vthzvs(n+1) is stored for use in the next cycle.

At the end of steps 206 or 210, control passes to step 212, where the value of the signal SW is brought to the high level (for example, 5 V).

In the next step 214, arrival of the falling edge FE of the signal START is monitored. Upon its arrival, control passes to step 216, where the output of the ZVS module is set at the low level (0 V).

At the end of these operations, control returns to step 202, where arrival of the new rising edge RE of the signal START is monitored.

Also the operating diagram of the ZVS module (see FIG. 21) is very similar to that of FIG. 14 of the ZCD module, with the major difference that the threshold of the ZVS module is directly compared with the signal Phase to determine the output signal of the ZVS module without being converted into a delay and obviously with an integration window of the ZVS module that is generated in a different way from that of the ZCD module.

Figure 21:
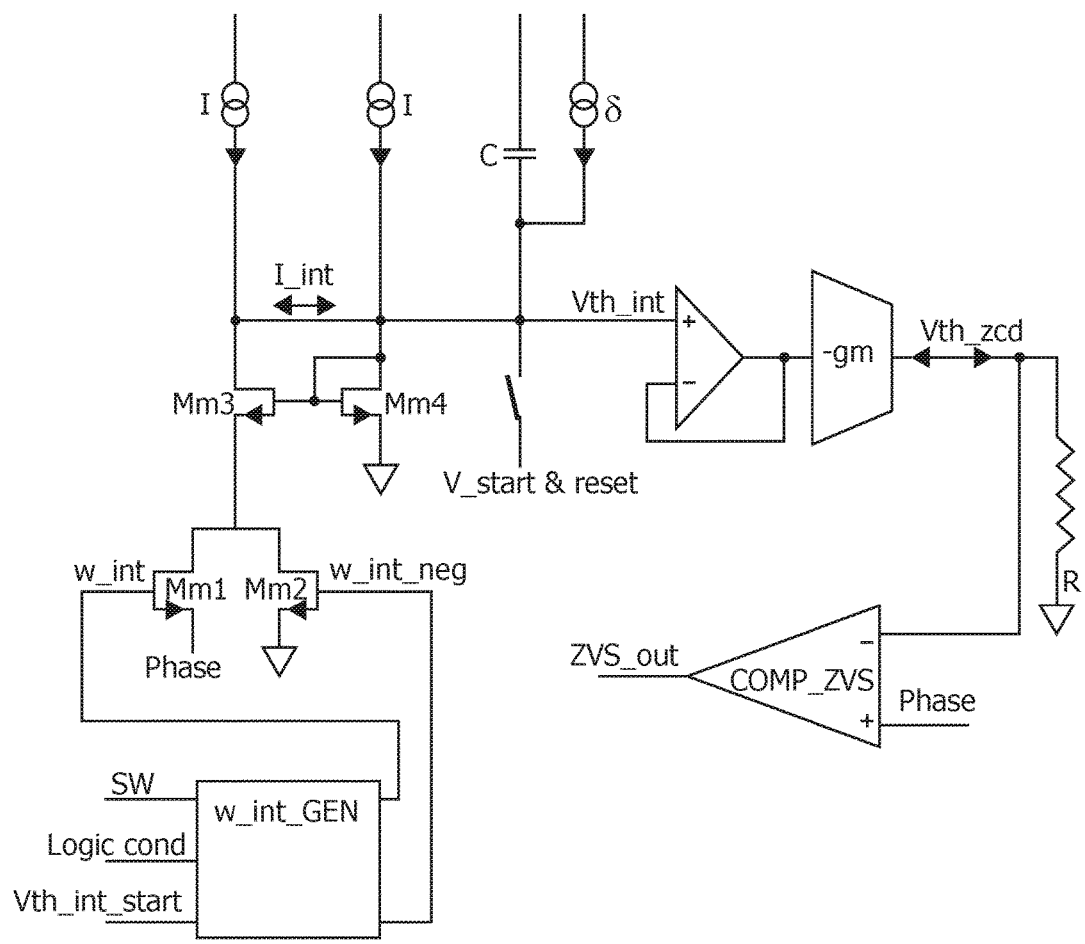
FIG. 21 shows a possible implementation of the ZVS module.

In particular, from observation of FIG. 21, the integration window is generated in the following way: once the logic module LOG sends confirmation to the ZVS module that the conditions are satisfied whereby the descending portion of the phase bump has been reached (see signal Logic cond at input to the module w_int_GEN), when the signal Phase crosses a fixed threshold Vth_int_start that is a few hundred millivolts above 0 V, the integration window is activated and is closed only when the transistor M* turns back on, i.e., when SW>Vthonm1.

At this point, integration of the under-voltage of the signal Phase occurs in a way similar to what has been described for the ZCD module. What changes is the different value of the gain parameters of the individual analog blocks, which are here calibrated in a different way to give rise to the threshold Vthzvs, which, as may be seen in FIG. 21, is directly compared with the signal Phase, via the comparator COMP_ZVS, to yield at output the signal of ZVS_out.

The condition of equilibrium that represents the condition where the transistor M* turns on at Phase=0 V will be reached when the threshold value Vthzvs reached at that point, referred to as Vthzvs_eq, is sufficiently high, and when the advance with which the transistor M* is turned back on is sufficiently great, for the residual under-voltage assumed by the signal Phase before the transistor M* turns back on to be so small in duration and amplitude that Δvthzvs_eq≈δvth.

What has been described is an adaptive system. In fact, if the conditions change, the system will enter a new condition of equilibrium with a turning-on threshold lower or higher according to the new conditions of the system.

Furthermore, also here there have been envisaged conditions of protection and resetting of the threshold in the case where it were to become necessary to bring rapidly the threshold back to the initial value or in the case where the logic conditions regarding the descending portion of the phase bump do not arise.

Of course, without prejudice to the principle of the present disclosure, the details of construction and the embodiments may vary widely with respect to what has been described and illustrated herein purely by way of example, without thereby departing from the scope of the present disclosure, as defined in the ensuing claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A resonant converter, comprising:
   a primary switching circuit having at least a primary winding and a primary full-bridge switching stage, which is configured for driving said primary winding, and an inductor in series with the primary winding, the primary full-bridge switching stage including high-side and low-side switches;
   a secondary resonant circuit having a secondary winding magnetically coupled to the primary winding, a resonance capacitor electrically connected in parallel to the secondary winding, a first secondary inductor and a second secondary inductor, each secondary inductor connected between an output terminal of the converter and a respective terminal of the resonance capacitor;
   a secondary rectification stage electrically connected in parallel to the resonance capacitor, the secondary rectification stage having a first switch and a second switch each connected between a respective terminal of the resonance capacitor and ground; and
   a driving module configured to receive at an input an enabling signal and a voltage measured across one of the switches of the secondary side, said module being configured for generating a control signal for controlling the switches of the secondary side, the driving module configured to cyclically,
      turn on low-side switches of said primary full-bridge switching stage and both switches of said secondary rectification stage and turning off high-side switches of the primary full-bridge switching stage;
      after a fixed time, turn off one of the low-side switches and turn on one of the high-side switches of the primary full-bridge switching stage;
      wait for a rising edge of said enabling signal;
      wait for the condition of zero current flowing in the first and second switches of the secondary side to be satisfied;
      turn off the first switch of the secondary side by sending the control signal to the low level after a variable delay with respect to the rising edge of the enabling signal, and keeping the second switch of the secondary side on;
      wait for the condition of zero voltage across the first switch of the secondary side to be satisfied; and
      switch back on the first switch of the secondary side by sending the control signal to the high level when the voltage measured across the first switch of the secondary side drops below a variable threshold; and
      execute the previous operations, reversing, with respect to one another, the roles of the high-side switches and low-side switches of the primary full-bridge switching stage and reversing, with respect to one another, the roles of the first switch and second switch of the secondary rectification stage.

2. The resonant converter according to claim 1 wherein said variable delay is processed by integrating an under-voltage that is generated after turning-off of the one of the switches of the secondary side.

3. The resonant converter according to claim 2 wherein at each integration cycle the variable delay to be applied at the next cycle is calculated according to the formula:

$$Dzcd(n+1)=Dzcd(n)+\Delta zcd(n)-\delta$$

where $Dzcd(n)$ is the current delay applied, $\Delta zcd(n)$ is the variation of the delay processed by the under-voltage-integration process, and $\delta$ is a small advance added at each cycle.

4. The resonant converter according to claim 3 wherein said driving module is further configured to provide protection and resetting conditions that bring the variable delay back to a zero value.

5. The resonant converter according to claim 1 wherein the high-side switches and low-side switches of the primary full-bridge switching stage and the first switch and second switch of the secondary rectification stage are transistors.

6. The resonant converter according to claim 5 wherein said transistors are MOSFETs.

7. A resonant converter, comprising:
a primary switching circuit having at least a primary winding and a primary full-bridge switching stage configured for driving said primary winding, and an inductor in series with the primary winding;
a secondary resonant circuit having a secondary winding magnetically coupled to the primary winding, a resonance capacitor electrically connected in parallel with the secondary winding, a first secondary inductor and a second secondary inductor, each secondary inductor connected between an output terminal of the converter and a respective terminal of the resonance capacitor;
a secondary rectification stage electrically connected in parallel with the resonance capacitor and having a first switch and a second switch, each first and second switch connected between a respective terminal of the resonance capacitor and ground; and
a driving module configured to
receive an enabling signal and a voltage across one of the first and second switches of the secondary side;
turn on and turn off independently of one another said first and second switches of the secondary rectification stage and the high-side and low-side switches of the primary full-bridge switching stage by controlling the switches to:
turn on the low-side switches of said primary full-bridge switching stage and both switches of said secondary rectification stage and to turn off the high-side switches of the primary full-bridge switching stage;
after a fixed time, turn off one of the low-side switches and turn on one of the high-side switches of the primary full-bridge switching stage;
wait for a rising edge of said enabling signal;
wait for zero current flowing in the first and second switches of the secondary side;
turn off the first switch of the secondary side after a variable delay with respect to the rising edge of the enabling signal while the second switch of the secondary side remains turned on;
wait for zero voltage across the first switch of the secondary side; and
turn back on the first switch of the secondary side when a voltage across the first switch of the secondary side drops below a variable threshold; and
wherein the driving module is configured to control the switches in this manner in alternate switching cycles, and to control the switches in the other switching cycles to reverse with respect to one another the control of the high-side switches and low-side switches of the primary full-bridge switching stage and to reverse with respect to one another the control of the first and second switches of the secondary rectification stage.

8. The resonant converter according to claim 7 wherein the high-side switches and low-side switches of the primary full-bridge switching stage and the first switch and second switch of the secondary rectification stage comprise MOSFETs.

9. The resonant converter according to claim 8 wherein said driving module comprises:
an adaptive zero-current detection module configured to generate a first control signal to turn off one of the first and second switches in the rectification stage each switching cycle, the first control signal having a variable delay with respect to the enable signal;
an adaptive zero-voltage switch module configured to generate a second control signal to turn on one of the first and second switches of the rectification stage each switching cycle, the second control signal having a variable threshold for a phase voltage across one of the first and second switches of the rectification stage; and
a logic module configured to manage a sequence of the events and the communication between said the adaptive zero-current detection and zero-voltage detection modules and to control a driver to generate a control signal applied to gate terminals of the first and second switches of the secondary rectification stage.

10. The resonant converter according to claim 9, wherein the adaptive zero-current detection module is further configured to adjust the first variable delay based on a small advance value and on an integration of an under voltage across the one of the first and second switches of the rectification stage that is being turned off.

11. The resonant converter according to claim 9, wherein the adaptive zero-voltage detection module is further configured to adjust the second variable delay based on an integration of the under voltage across the one of the first and second switches of the rectification stage that is being turned on.

12. A method for driving a resonant converter, comprising:
turning on low-side switches of a full-bridge switching stage including high-side and low-side switches;
turning off the high-side switches of the full-bridge switching stage;
turning on first and second switches of a secondary rectification stage, each of the first and second switches being coupled in parallel between a respective node of a resonance capacitor and a reference node;
turning off after a fixed time one of the low-side switches and turning on one of the high-side switches of the primary switching stage;
detecting a first transition of an enabling signal;
detecting a zero-current condition in the first and second switches of the secondary side;
turning off the first switch of the secondary side after a variable delay with respect to the first transition of the enabling signal while keeping the second switch of the secondary side turned on;
detecting a zero voltage condition across the first switch of the secondary side; and
turning the first switch of the secondary side back on responsive to a phase voltage across the first switch reaching a variable threshold;
repeating the previous operations each alternate switching cycle of the resonant converter; and
during each intervening switching cycle between these alternate switching cycles,
reversing with respect to one another the control of the high-side switches and the low-side switches of the full-bridge switching stage, and
reversing with respect to one another the control of the first and second switches of the secondary rectification stage.

13. The method of claim 12, wherein detecting the first transition of the enabling signal comprises detecting a rising edge of the enabling signal.

14. The method of claim 12, wherein turning off the first switch of the secondary side after the variable delay comprises generating a value for the variable delay for a next switching cycle based on integration of a phase signal generated across the first switch after the first switch is turned off.

15. The method of claim 14, wherein generating the value for the variable delay for the next switching cycle based on the phase signal generated across the first switch after the first switch is turned off comprises generating the value for the variable delay to be applied at the next switching cycle according to the formula:

$$Dzcd(n+1)=Dzcd(n)+\Delta zcd(n)-\delta$$

where Dzcd(n) is the current value of the variable delay being applied, $\Delta zcd(n)$ is the variation of the variable delay generated through integration of the phase signal across the first switch after the first switch is turned off, and $\delta$ is a small advance added at each switching cycle.

16. The method of claim 12, wherein turning the first switch of the secondary side back on responsive to the phase signal across the first switch reaching the variable threshold comprises generating the variable threshold for a next switching cycle based on an integration of the phase signal after the phase signal reaches the variable threshold during a current switching cycle.

17. The method of claim 16, wherein generating the variable threshold for a next switching cycle based on an integration of the phase signal after the phase signal reaches the variable threshold during a current switching cycle comprises setting the variable threshold to an initial value of approximately zero for an initial switching cycle and incrementing the value of the variable threshold until the variable delay causes the first switch to be turned back on at a zero-voltage condition for the first switch.

18. The method of claim 16, wherein generating the variable threshold for the next switching cycle comprises calculating the variable threshold according to the formula:

$$Vthzvs(n+1)=Vthzvs(n)+\Delta vthzvs(n)-\delta vth$$

where Vthzvs (n+1) is the variable threshold for next switching cycle n+1, Vthzvs (n) is the variable threshold during the current switching cycle, $\Delta vthzvs(n)$ is a parameter based on integration of an under-voltage of the phase signal, and $\delta vth$ is a small fixed threshold value.

19. The method of claim 16, wherein turning the first switch of the secondary side back on responsive to the phase signal across the first switch reaching the variable threshold further comprises turning the first switch back on a fixed delay time after the phase signal reaches the variable threshold.

20. The method of claim 17 further comprising defining an integration window that identifies a time interval over which within which to make the integration of the under-voltage of the phase signal to generate the $\Delta vthzvs(n)$ parameter.

* * * * *

UNITED STATES PATENT AND TRADEMARK OFFICE
CERTIFICATE OF CORRECTION

| | |
|---|---|
| PATENT NO. | : 9,647,565 B2 |
| APPLICATION NO. | : 15/141314 |
| DATED | : May 9, 2017 |
| INVENTOR(S) | : Roberto Cardu et al. |

It is certified that error appears in the above-identified patent and that said Letters Patent is hereby corrected as shown below:

On the Title Page

<u>Item (30) Foreign Application Priority Data:</u>
"Oct. 1, 2015 (IT) UB15A004179" should read --Oct. 1, 2015 (IT) 102015000057295--.

Signed and Sealed this
Twentieth Day of August, 2019

Andrei Iancu
*Director of the United States Patent and Trademark Office*